Aug. 17, 1943. S. I. CORY 2,327,176
DRIVING CLUTCH AND CONTROL MEANS THEREFOR
Filed Jan. 2, 1941 2 Sheets-Sheet 1
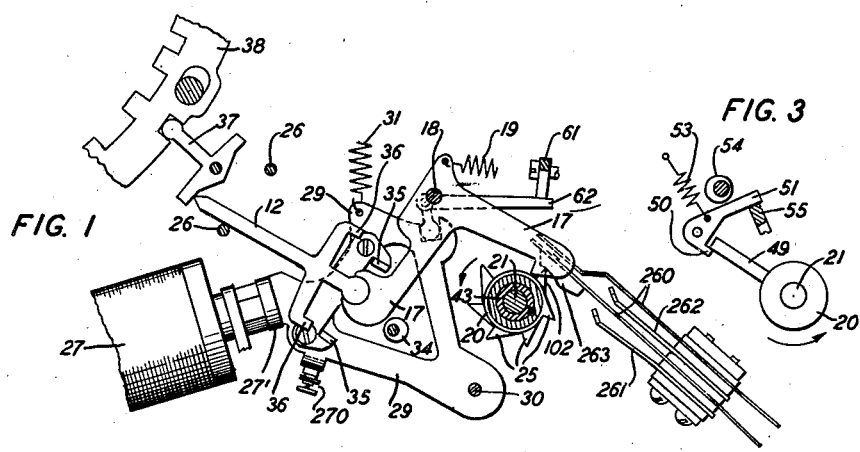
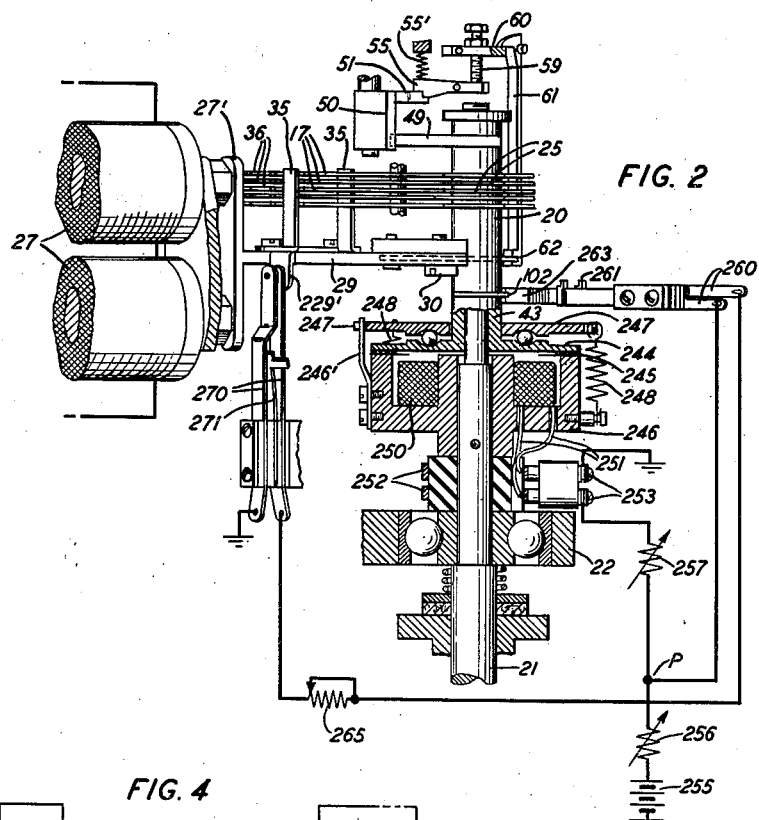
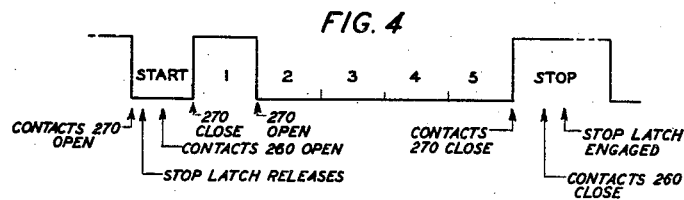
INVENTOR
S. I. CORY
BY
ATTORNEY Aug. 17, 1943.　　　S. I. CORY　　　2,327,176
DRIVING CLUTCH AND CONTROL MEANS THEREFOR
Filed Jan. 2, 1941　　　2 Sheets-Sheet 2
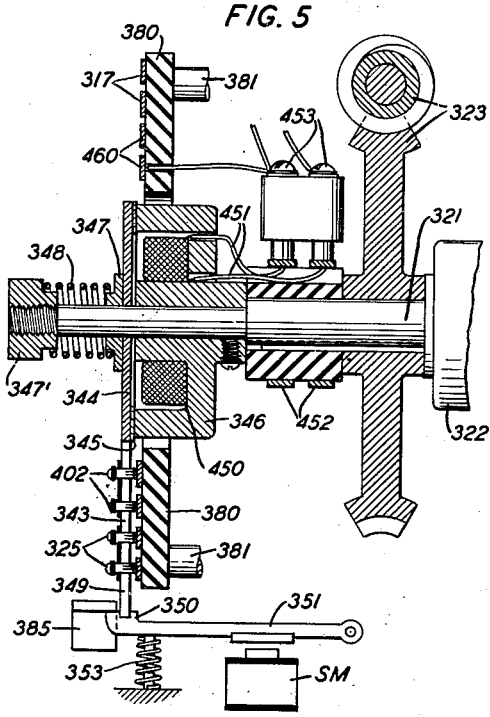
FIG. 5
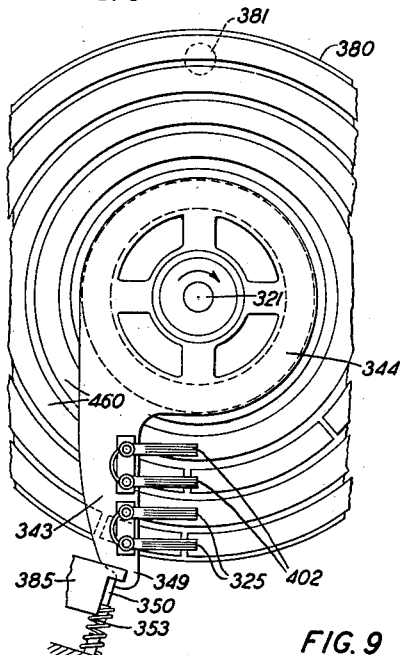
FIG. 6
FIG. 9
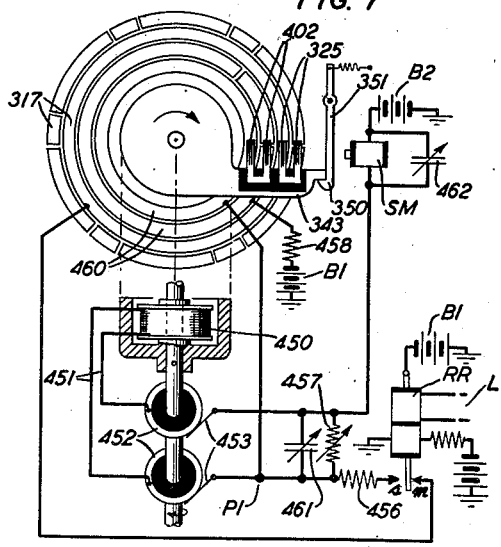
FIG. 7
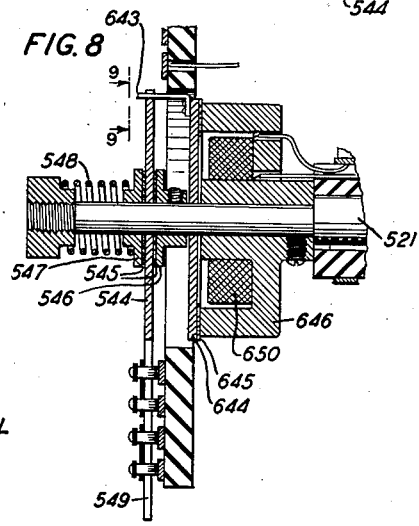
FIG. 8
INVENTOR
S. I. CORY
BY
J. E. Rasmussen
ATTORNEY Patented Aug. 17, 1943

2,327,176

UNITED STATES PATENT OFFICE 2,327,176

DRIVING CLUTCH AND CONTROL MEANS THEREFOR

Samuel I. Cory, Towaco, N. J., assignor to Bell Telephone Laboratories, Incorporated, New York, N. Y., a corporation of New York Application January 2, 1941, Serial No. 372,707

11 Claims. (Cl. 192—142)

This invention relates to driving clutches and control means therefor and especially to driving clutches adapted for exerting a variable driving force.

More specifically the invention relates to friction clutches of the start-stop type in which a continuously rotating shaft exerts a driving force through friction surfaces upon a driven member which at times is retarded or held stationary.

An object of the invention is to provide a driving clutch for variable or intermittent driving of the driven member of the clutch in which the driving force during one driving condition is lighter than during another driving condition.

Intermittently driven friction clutches are used extensively in the telegraph plant for driving rotating telegraph apparatus, which normally is held stationary and is started up to make one revolution in response to an incoming signal. For the sake of accurate operation of such start-stop telegraph apparatus to accurately reproduce or repeat incoming signals, it is essential that the device be started quickly and attain full speed in the shortest possible time, delay in starting amounting to a few thousandths of a second often resulting in erroneous reproduction or repeating of the received signals. It is also important for the proper timing of successive selecting operations taking place during a single revolution or operating cycle of the telegraphic device, that the driven part of the clutch rotate in unison with the driving part which is maintained at a constant speed so that the successive selecting operations may be accurately synchronized with the successive impulses of an incoming signal representing a character.

With the extensive use of apparatus of this type and the continuous wear to which clutches of this type are subjected daily, it is furthermore important that maintenance be reduced as far as possible to reduce the cost of commercial operation.

For this and other reasons it is a further object of the invention to provide a clutch in which the pressure on the starting latch exerted by the driven member in stop condition should be comparatively light so that the latch may be quickly removed by a small force.

It is a further object of the invention to provide a clutch in which a comparatively heavy driving force is produced during rotation so that highly accurate timing of successive operations during an operating cycle may be positively secured due to the unison of rotation between the driven and the driving member, the latter being driven at a closely controlled constant speed.

It is thus a still further object of the invention to bring the driven member to a stop under the lighter driving force so that the impact between the driven member and the stop latch will be comparatively light, thereby reducing the tendency to deformation and breakage of the parts involved in the stopping operation.

It is yet another object of the invention to secure positive driving during rotation at the same time as the wear on the friction surfaces during the stop condition is considerably reduced so that accuracy of operation may be attained at the same time as the life of the clutch is materially prolonged.

In accordance with a general feature of the invention a clutch of this type is provided in which a comparatively light driving force may be exerted on the driven member as by a correspondingly light frictional spring pressure or other mechanical pressure applied to the friction surfaces between the driving and the driven members of the clutch and in which the driving force of the clutch is increased by magnetizing a magnetic circuit formed by parts of the driving as well as the driven members of the clutch.

In accordance with a more specific feature of the invention the parts of the clutch are shaped to form a magnetic circuit for an energizing winding with poles coinciding with the friction areas of the clutch so that energization of the winding, by establishing a magnetic field between the poles of the driving member and the driven member, will produce a heavier frictional driving force than that produced during deenergization of the said winding.

It is a particular feature of the invention that the driving force during rotation as established by magnetization and by the spring pressure should be sufficient to insure positive driving of the driven member in unison with the driving member under any load for which the clutch is designed during its rotation, and that at the same time the driving force exerted by spring pressure alone during stop condition be as low as possible to reduce wear, yet sufficient to complete the rotation of the driven member after the magnetization has been discontinued and to bring the driven member to a positive stop, as well as to hold the driven member positively in engagement with the stop latch during stop condition.

Inasmuch as synchronism between the incoming start-stop signal impulses and the corresponding successive selecting operations of the driven apparatus is established by the angular displacement in time of arrival and of rotation, respectively, from the start impulse it is an important advantage of the invention that by its provisions the starting of the device may be made instantaneously positive, so that there will be no uncertainty of operation at the most critical portion of the operating cycle, namely at starting.

It is an essential feature of the invention as applied to start-stop telegraph apparatus that it obviates the usual limitations on the driving force and permits sufficient driving force to be supplied by magnetization to insure perfect unison between the driving and driven members at the very moment rotation starts, eliminating slippage or variation of performance from one time to another, so that the starting operation will be identical for successive operating cycles or rotations. This is particularly important for testing systems, such as referred to below.

The mechanical load involved in the starting being easily overcome by the magnetized clutch and the magnetization of the clutch being a matter of readily controlled circuit constants, it is evident that the phase angle covered by the starting operation may be reckoned with as a constant characteristic and therefore may be taken fully into account in orienting the driven telegraph apparatus relative to the incoming impulses, as is well known in the telegraph art.

In accordance with a more specific feature of the invention the operations for starting and stopping the driven member and for applying and discontinuing the magnetic driving pressure are relatively timed during the operating cycle to insure the proper operation of the clutch in accordance with the various objects enumerated above. Thus the magnetization of the clutch is timed to attain an appreciable field strength immediately subsequent to the complete removal of the stop latch for starting of the driven member, so that the greater driving force will be available when the driven member has barely, if at all, started out from its stop position. When the driven member approaches the end of a revolution or at any other predetermined time during the revolution, the magnetizing force is discontinued by means of properly arranged contact and circuit means so that the driven member will continue its travel to its stop position only under the force of the spring pressure.

The invention will now be described more in detail and for this purpose it will be described in connection with two specific embodiments illustrated in the attached drawings. These embodiments are intended as examples of the application of the invention and should not be taken to limit the scope of the invention by the specific features involved.

In the drawings:

Figs. 1, 2 and 3 are different views of certain parts of a telegraph typewriter of the type disclosed in United States Patent 1,745,633, issued to S. Morton et al. on February 4, 1930. Only such parts of the typewriter are shown in these figures as will serve to illustrate the application of the invention. Fig. 1 is a fractional top view showing the selecting mechanism; Fig. 2 is a fractional side view of the selector mechanism and the driving clutch and Fig. 3 is a detailed top view of the start mechanism;

Fig. 4 is a schematic diagram illustrating the timing of different operations during the operating cycle involved in the reception of a signal series of pulses representing a character;

Figs. 5 and 6 show telegraph distributor mechanism of the type frequently used in start-stop transmission of telegraph signals or in testing equipment for use in the telegraph plant, such as the telegraph testing system disclosed in United States Patent 2,206,452, issued to S. I. Cory on July 2, 1940. Fig. 5 is a cross-sectional view of the distributor device including the clutch mechanism and Fig. 6 is an end view of the device;

Fig. 7 is a schematic circuit diagram showing such parts of the circuit equipment for the distributor device and its clutch as are necessary for an understanding of the invention and its operation; and Figs. 8 and 9 are detail views of a distributor mechanism similar to that shown in Figs. 6 and 7 to which, however, the invention is applied in a different manner.

Referring now particularly to Figs. 1 to 4 of the drawings the clutch mechanism is here shown as utilized in the driving of the selector mechanism for a start-stop printing device, such as disclosed in the patent to Morton referred to above.

The Morton printer, and printers of this general type, comprise mechanism for selection of type bars and functions in the printer in response to incoming signals, and other mechanism for performing the actual printing and functional operations of the printer. The first part of the printer is composed of a number of comparatively delicate and easily operated mechanical parts which require comparatively light driving power and which must be operated quickly and accurately in order that the printer may accurately reproduce the incoming message. These two parts of the printer are separately driven through separate friction clutches from a power shaft which receives its power from any type of drive, such as an electric motor, as contemplated by Morton.

Figs. 2, 3 and 4 show the invention applied to the clutch for the selecting mechanism of the printer. For details of the printing mechanism reference should be had to the Morton patent. It should however be understood that the invention is also readily applicable to the clutch for the printing mechanism of the Morton printer.

The power shaft 21 in the printer is continuously rotating and the selecting mechanism is intermittently operated from the power shaft through the means of a cam sleeve 20 which stops once for each revolution for the purpose of securing synchronism between the successive cam operations of the selecting mechanism and the corresponding individual impulses of a character signal received by the receiving magnet 27.

For this purpose the cam sleeve 20 is loosely mounted for free running on the power shaft 21 and is in driving engagement with the power shaft 21 through a friction clutch, but is normally prevented from rotating by means of a stop mechanism.

The cam sleeve 20 carries a plurality of camming surfaces or teeth 25 for successive engagement with a corresponding plurality of stationary levers 17 through which operating action is imparted to the corresponding plurality of selector elements or commutation bars 38 under selective control by the receiving magnet 27 in accordance with incoming impulses. This selective action and its purpose of selecting type bars in accordance with incoming signals is fully described in the Morton patent, and since these operations do not form any part of the invention, further description thereof appears to be unnecessary.

The power shaft 21 is journalled in ball bearings 22, one of which is shown in Fig. 2, and carries at its upper end the free running cam sleeve 20. Between the cam sleeve 20 and the ball bearing 22 a friction clutch is provided for driving the cam sleeve 20.

Cam sleeve 20 comprises a mounting sleeve 43 having its lower end formed into a disc 244 constituting the driven member of the clutch. On the shaft 21 is fastened the driving member 246 of the clutch which is substantially cup-shaped to present two concentric annular pole faces to the driven disc 244. Within the cup-shaped member 246 is an energizing winding 250 for setting up a magnetic flux in the magnetic circuit formed by the driving member 246 and the driven disc 244. The disc 244 and cup 246 are of suitable magnetizable material such as iron or soft steel of low remanence.

The outer rim on the lower side of disc 244 and the outer rim on the driving member 246 are juxtaposed about the entire circumference of the clutch and are especially prepared in well-known manner for cooperation with a ring 245 of suitable friction material for imparting a driving force from the driven member 246 through the friction ring to the driven disc 244. A comparatively light driving pressure is exerted on the friction surfaces by means of a plurality, three in the present case, of helical springs 248 attached at their lower end to the driving member 246 and at their upper end to a pressure disc 247 engaging with the driven disc 244 through ball bearings in any conventional manner. The pressure disc 247 is caused to rotate positively with the continuously rotating driving member 246 by means of an arm 246' secured to the driving member 246 and having its free end in engagement with a slot 247' cut in the periphery of the pressure disc 247. Thus in accordance with this arrangement the cam sleeve 20 and the disc 244 may be held stationary by the stop arrangement described hereinafter, while the driving member 246 of the clutch exerts a light driving force upon stationary disc 244 through the friction surfaces, and the pressure on the friction surfaces is maintained by the springs 248 through the pressure disc 247 and the ball bearings upon the stationary disc 244.

The winding 250 within the clutch is connected by two leads 251 to two slip rings 252 mounted for rotation with shaft 21, and the outside circuit for operation of the magnet is connected to the slip rings through a pair of suitable brushes 253.

The cam sleeve 20 is held against operation once during each revolution for a series of seven impulses by means of the stopping arrangement shown at the upper end of shaft 21 in Fig. 2. Certain details of the stopping arrangement are shown in plan view in Fig. 3. Thus the cam sleeve 20 carries a stop arm 49 which in stop position engages a stop latch 50 on the stationary arresting dog 51. The continuous driving force from the shaft 21 acting through stop arm 49 tends to rotate the dog 51 against the tension of spring 53 but is prevented under stop conditions from doing this by means of the notched end of the latch 55 which is held in engagement with the dog 51 by spring 55'. The relations between these parts are maintained in this manner during stop condition.

The receiving magnet 27 has an armature 27' mounted on a triangular lever 29 which is pivoted at 30. The armature 27' is normally, that is when magnet 27 is energized, attracted close to the pole-pieces of the magnet against the tension of spring 31. When the magnet is deenergized the armature and the triangular lever 29 moves through a small angle until one side of the lever 29 engages the adjustable stop 34.

The armature lever 29 carries two projecting lugs 35 which cooperate with the selecting mechanism to impress the two characteristics of the incoming impulses upon corresponding selecting elements, as fully described in the Morton patent.

For operation of the start-stop mechanism the armature lever 29 has on one side a slot co-operating with one end of a pivoted lever 62 the free end of which engages the lower end of a bell crank lever 61 extending vertically to the stop mechanism. The bell crank lever 61 at its upper end has an extension in engagement with the lever 60 placed immediately above the latch 55. Therefore, when a start impulse is received by the magnet 27 in the form of a no-current period the receiving magnet becomes deenergized and armature lever 29 is rotated a small distance in a clockwise direction around its pivot 30. Through the slot engagement the lever 62 acts upon the lower end of bell crank lever 61 the upper extension of which in turn depresses lever 60 which in turn depresses one end of latch 55 to remove the notched end of the latch 55 from dog 51. These various actions are of course instantaneous and as soon as the dog 51 is released the stop arm 49 forces its way past latch 50 which thereupon is returned by spring 53 against the adjustable stop 54 ready to stop the stop arm 49 after one revolution of the cam sleeve 20.

For control of the energizing winding of the clutch two sets of contacts are provided. One set may be called the starting contacts and serve to energize the clutch magnet when the start pulse is received. These contacts are operated by an extension 229' on the armature lever 29 and comprise the contact springs 270 held in engagement by the extension 229' when the receiving magnet 27 is energized and tending to open when lever 29 is retracted. An adjusting member 271 is mounted together with the contact springs for adjustment of the contact opening and the timing of the contact operations in well-known manner.

The other set of contacts 260 may be called the off-normal contacts and serve to maintain the magnet in the clutch energized during the greater part of the revolution. These contacts are controlled by a special tooth 102 on the cam sleeve 20 which is provided to, near the end of the revolution, start the printing equipment into a subsequent revolution upon completion of the selecting action during the nearly completed revolution. For cooperation with the tooth 102 one of the contact springs 260 carries a cam member 263 having a portion of its surface curved concentrically with the cam sleeve and engaged by the tooth 102 to keep the contacts 260 closed during the time the tooth 102 travels or stops in engagement with this curved surface. Shortly after starting of cam sleeve 20 for rotation in a counter-clockwise direction tooth 102 will leave the camming member 263 and thereby permit the contacts 260 to open. The stop members 261 and 262 mounted together with the contact springs 260 are adjusted to secure proper operation of contacts 260. Near the completion of the revolution the tooth 102 approaches the camming piece 263 which has a camming surface facing the tooth 102, thereby permitting the tooth to raise the camming piece 263 and close contacts 260 some time before the cam sleeve 20 arrives in the stop position illustrated in Fig. 1.

A circuit arrangement for the energizing winding 250 is shown in Fig. 2 and may be traced as follows: from battery 255, through resistance 256 to the point P at which the circuit branches over the normally closed contacts 260 and normally closed contacts 270 in series to ground, and from point P over adjustable resistance 257 over brushes 253 and slip rings 252 through winding 250 to ground. The short-circuited resistance 265 is included in this circuit. Thus, under normal condition when the selecting mechanism is at rest the winding 250 is short-circuited by the contacts 260 and 270. Immediately upon deenergization of receiving magnet 27 contacts 270 will be opened, thereby opening the short circuit for winding 250 which now becomes energized. After a small movement of tooth 102 from stop position contacts 260 open and remain open during the main part of the revolution until the tooth 102 again closes them. Thus winding 250 will remain energized during the greater part of the revolution independently of operations of armature 27 in response to incoming impulses, the contacts 260 serving to keep the short circuit for winding 250 open.

The sequence of operations may be more readily understood by examination of the diagram shown in Fig. 4. In this figure the heavy line indicates the current strengths through the receiving magnet 27 as it varies during the reception of a start-stop signal series of impulses representing a certain character. Thus, beginning at the left of Fig. 4 the magnet 27 is normally energized and when a start impulse arrives the current is reduced to zero for the duration of the start impulse. Assuming that the No. 1 selecting impulse is a marking impulse the current will again rise in magnet 27 to magnetize the magnet for the duration of the No. 1 impulse. Then assuming that the remaining selecting impulses are spacing impulses, the current will again reduce to zero after the No. 1 pulse and will keep the magnet deenergized until the end of the No. 5 pulse; thereupon the magnet will again be energized by current during the stop pulse, which usually is somewhat longer than the other impulses.

Upon arrival of the start pulse the contacts 270 are opened by the armature lever 29 and practically simultaneously therewith the stop latch 50 is released to permit the stop arm 49 to pass by and start rotation of the cam sleeve 20 under the spring pressure on the friction clutch. In the meantime, the magnetism produced by winding 250 builds up and attains full strength to aid in the quick release of the stop latch 50 by exerting a more positive driving force upon the friction surfaces of the clutch through the magnetic attraction between the driven disc 244 and the driving member 246. At some time during the start pulse, say about the middle, the off-normal contacts 260 are opened so that the winding 250 will remain energized until the stop pulse arrives. In synchronism with the incoming selecting pulses the contacts 270 alternately close and open and will remain closed when the stop pulse arrives. Some time during the stop pulse the off-normal contacts 260 will also close for completing the short circuit about winding 250 which consequently becomes deenergized, thereby reducing the driving force on the friction clutch to that of the spring pressure. Thus, when the stop arm 49 again is stopped by impact with the stop latch 50 the driving force exerted on the cam sleeve 20 is comparatively light thereby reducing the impact. It will readily be seen that the current in the winding 250 may be adjusted, as by adjustment of resistances 256 or 257, so that any desired driving power may be secured during rotation.

The invention will now be described as applied to the start-stop distributor mechanism shown in Figs. 5, 6 and 7 in the drawings.

Distributor mechanisms of this type are widely used in the telegraph plant and an important requirement is that they operate in close synchronism with the incoming signals. An important use for such distributors is in testing circuits used in the maintenance of commercial telegraph circuits and since such circuits usually provide standards of comparison it is particularly important that the distributor in the circuit operate with uniform accuracy. An example of this type of test circuit is disclosed in the Cory Patent 2,206,452 already referred to.

The distributor shown in Figs. 5 and 6 comprises a stationary mounting plate 380 fastened by studs 381 at convenient points to the frame of the device. The plate 380 carries a plurality of contact rings arranged in pairs such, as 317 and 460. Certain of the rings are cut into sections distributed about the circle and of lengths in accordance with the circuit requirements.

The rotating parts of the distributor include a continuously rotating shaft 321 suitably journaled in bearings, such as the bearing 322, and motor-driven through a worm gear 323. On the shaft is fixedly mounted the driving member 346 of a friction clutch. The disc-shaped member 344 is in frictional engagement with the driving member 346 through a ring 345 of suitable frictional material placed between juxtaposed surfaces along the rims of the members 344 and 346. The driven member 344 is kept in driving engagement with the driving member 346 by means of a light spring 348 acting between a washer 347 and a shoulder on the nut 347' fixedly attached to the shaft 321. The surfaces between the running washer 347 and the intermittently rotating disc 344 are made substantially frictionless as by proper surface treatment and oiling.

The driven disc 344 carries a brush arm 343 on which are mounted pairs of contact wipers or brushes 325 and 402, respectively, for making contact at their free ends with the corresponding pairs of contact rings 317 and 460 on the stationary distributor face 380. The wipers are insulated from the arm 343 and the wipers of each pair are directly interconnected thereby completing a circuit between the corresponding pairs of segmented rings on the distributor face. During rotation of the disc 344 through one revolution the wipers will travel at constant speed over the distributor face and will engage successive segments thereof to control the circuits connected to the various segments at predetermined times fixed by the angular displacement of the segments from the stop position of the wipers.

The stopping arrangement includes a stop latch 350 on the end of the armature 351 of the start magnet SM. The armature 351 is held retracted from magnet SM by means of spring 353. In retracted position the latch 350 will be in the path of the end 349 of distributor arm 343 to act as a positive stop for the arm. The latch 350 is adapted to cooperate with a stationary guide piece 385 serving as a back stop for the latch 350 and also serving to take up the impact blow on the latch 350 when the distributor arm 343 arrives in stop position.

When the armature 351 is attracted by the start magnet SM the latch 350 is removed from the path of the arm 343 which thus is free to rotate with the driven disc 344 under the light spring pressure of the friction clutch.

The driving member 346 of the clutch is substantially cup-shaped to present a central pole face and an outer annular pole face to the driven disc 344. The energizing winding 450 is placed within the hollow of the member 346 for rotation therewith and two leads 451 connect the winding through two suitable slip rings 452 and two stationary brushes 453 of any convenient design for connection to the control circuit. When current flows in the winding 450 a magnetic flux is produced in the annular magnetic circuit formed by the cup-shaped member 346 and disc-shaped member 344, thereby establishing a magnetic field of attraction between the outer juxtaposed rims of the driving and driven members; the consequent attraction between these rims increases the pressure on the friction ring 345 between them, thereby increasing the frictional driving force exerted by the driving member 346 upon the driven member 344.

For a description of the operation and timing of the various elements in the distributor arrangement shown in Figs. 5 and 6 reference will now be made to Fig. 7 in which parts corresponding to those in Figs. 5 and 6 are correspondingly numbered.

A polar relay RR is controlled by signals incoming to its upper winding over a line circuit L from any source of start-stop signals. The line circuit L is normally in marking condition, during which it is closed, so that current through the upper winding of the relay will normally keep the armature of the relay operated to its marking contact m. During spacing condition in the line circuit L no current flows in the upper winding of the relay and the armature is operated to its spacing contact s by the lower biasing winding, which in continuously energized as by current about half the strength of the line current.

The circuit of Fig. 7 is shown in its marking or rest condition with the distributor arm 343 in engagement with the stop armature 351 under a light driving force by the friction clutch.

The starting circuit for the distributor may be traced as follows: from positive battery B2 through start magnet SM over brushes 453 and slip rings 452 through the clutch winding 450 then through resistance 456, over spacing contact of relay RR to negative battery B1. Therefore, when a spacing or open impulse arrives over line L, representing the start pulse of a character signal series, and relay RR operates to spacing the starting circuit just traced will be completed and start magnet SM and clutch winding 450 will be energized. Start magnet SM attracts its armature 351 thereby releasing distributor arm 343 for rotation. With proper timing this operation takes place while the driving force of the clutch is light. In the meantime, the magnetic field in the clutch builds up and attains full strength immediately after the removal of the stop latch 350. The distributor arm thereafter is driven by a heavy positive driving force on the clutch and thus will rotate in unison with the constant speed driving shaft 321.

It should be stated here that for telegraphic devices of this type equipment is usually provided for securing substantially constant speed within very narrow and adjustable limits of the continuously rotating driving shafts, such as the shaft 321. Such speed control is well known and is not disclosed herein because it does not form part of the invention.

The start pulse as will appear from Fig. 4 is of comparatively short duration and relay RR is operated to marking at the end of the start pulse in response to an incoming marking No. 1 pulse thereby opening the start circuit. However, immediately after the brush arm was started out from its stop position one brush of the pair 402 came in engagement with a long segment in the outer ring of the pair 460 thereby closing an energizing circuit for clutch winding 450 which may be traced as follows: from positive battery B2 through magnet SM, brushes 453 and slip rings 452 through clutch winding 450 and then over point P1 to the inner ring 460, brushes 402 and the long segment of outer ring 460, resistance 458 to negative battery B1. An energizing circuit is thus established for winding 450, which is independent of the intermittently closed spacing contact of relay RR. In this manner the driving clutch remains uniformly energized for the entire time during which the brushes 402 are engaging the long segment of rings 460.

One ring of the outer ring pair 317 is divided into segments of suitable length which may correspond to the segmented ring of the distributor used in the test circuit of the Cory Patent referred to above, so that the outer brushes 325 may control circuits, in the manner described in the Cory Patent, during each revolution of the distributor arm and in accurate synchronism with the impulses incoming over the line L.

The long segment of rings 460 may be extended to a point along the brush path located so that the brushes 402 will pass off the segment at a time subsequent to completion of operations controlled by the distributor in time with the No. 5 pulse and in fact at some time after the first transition of the stop impulse has arrived. Thus during the stop pulse, which is a marking pulse, the relay RR will be operated to marking thereby keeping the start circuit open at its spacing contact, and after the brushes 402 have passed off the long segment the holding circuit for clutch winding 450 and start magnet SM will be interrupted. Under this condition start magnet SM will release its armature 351 in time to place latch 350 in the path of distributor arm 343 to stop the arm in stop position as shown in Fig. 7, and the clutch will become deenergized in ample time before the distributor arm 343 arrives in stop position. Thus the impact between arm 343 and stop latch 350 will be comparatively light since the driving force by the clutch is reduced to that effected only by the comparatively light spring pressure on the frictional surfaces of the clutch. When the brush arm 343 stops in engagement with the stop latch 350, the brushes 402 stop just short of the long segment of the ring pair 460 and the circuit will remain in stop condition as shown in Fig. 7 for the duration of the stop pulse, ready to resume operations through another revolution in response to the next incoming character signal series.

The relative timing between the operations of the stop latch 350 and the clutch winding 450 may be effected by proper design of the various parts involved, or the energization of the magnet SM and winding 450 may be shifted, one relative to the other, by means of condensers 461 and 462, adjustable to delay the rise of current in their associated windings, as is well known. The relative current strength in the two windings may also readily be adjusted as, for example, by means of an adjustable resistance 457 in multiple to clutch winding 450.

It should be understood that the invention may be particularly adapted for many different purposes and for many different types of apparatus without a departure from its general principles and features such as set forth in the appended claims.

The invention is furthermore not limited to the use of a single set of friction surfaces, since for example, a magnetic clutch may be added as a driving unit in itself to the conventional spring pressed friction clutch without a departure from the spirit of the invention.

An example of such an arrangement is shown in Figs. 8 and 9. In this arrangement the continuously rotating shaft 521 rotates the brush arm 549 through a conventional friction clutch comprising the driving member 546 fixed to the shaft, the spring pressed member 547, the driven disc 544 carrying the arm 549 and the intermediate friction rings 545. These elements of the distributor mechanism are operated and function in the conventional manner in response to incoming start-stop telegraph impulses, except that the spring pressure exerted by spring 548 on the friction clutch may be appreciably less than in the conventional mechanism. This spring pressure should be sufficient to bring the brush arm 549 definitely to its stop position after the magnetic driving force from the magnetic clutch, to be described hereinafter, has been removed; and the spring pressure should be sufficient also to positively hold the brush arm 549 in engagement with the stop latch in stop position. With the spring pressure on the friction clutch reduced to merely satisfy the conditions just specified the friction clutch might not be able to rotate the brush arm 549 out of stop position, nor might it be able to keep the brush arm 549 rotating through the revolution in unison with the shaft 521, as required for proper synchronism. It would not provide sufficiently strong starting effort to ensure the desired uniformity in starting.

For these reasons a magnetic driving clutch is provided in addition to the friction clutch. The magnetic clutch comprises the cup-shaped driving member 646 fixed to the shaft 521, the driven disc-shaped member 644 and the friction ring 645 attached in any suitable manner, for example, to the pole surface of the driving member 646. Within the magnetic circuit formed by the members 644 and 646 is placed the energizing winding 650 which is connected through slip rings and brushes to a control circuit in a manner similar to that shown in Figs. 5 and 7.

The driven disc 644 is free running on shaft 521 and is kept in juxtaposition to the annular pole face of the driving member 646, as for example, by the hub portion of the driving member 546 of the friction clutch; thus during deenergization of the magnetic clutch the disc 644 may be clearing the friction ring 645 or engaging it with a slight pressure so that it will not be subjected to any appreciable driving friction while being held in stop condition. The driven disc 644 of the magnetic clutch is connected mechanically with the driven disc 544 of the friction clutch as for example by means of one or more angular extension arms 643 attached to the disc 644 and each engaging in a notch cut in the periphery of the disc 544 with a tight fit between these parts. In this manner the two driven discs 544 and 644 are made to stop, start and rotate exactly in unison.

The operations of this clutch arrangement are identical with those fully described for the arrangement in Figs. 5, 6 and 7. When the stop arm 549 engages its stop latch the driven discs 544 and 644 are held in stop condition by the light driving force from the friction clutch. When a start impulse arrives the start magnet for the distributor and the clutch winding 650 are energized, the former to free the driven members for rotation and the latter to energize the magnetic clutch, thereby attracting the driven disc 644 with comparatively great force against the friction ring 645 to exert a heavy driving force through the arm 643 to the driven disc 544 with its brush arm 549. This condition is maintained for the greater part of the revolution whereupon the magnetic clutch is deenergized and the brush arm 549 is brought through a comparatively short angular distance to its stop position by the light driving force of the spring pressed friction clutch, substantially as described in connection with Figs. 5, 6 and 7. It should be added that each arm 643 is fitted closely into its slot in disc 544 to provide negligible angular play yet allowing axial movement of the arm 643 in the slot as the driven disc 645 is attracted or released by the magnetic clutch.

It is also within the scope of the invention to reduce the spring pressure on the friction clutch to such an extent that it may be entirely negligible as far as the driving force is concerned. The springs in such case merely serve as means for holding certain elements in juxtaposition. For such an arrangement the magnetic clutch may be controlled to normally exert a frictional driving force corresponding to the reduced driving force exerted by the spring pressure in the embodiments already described herein and to during starting and rotation exert a heavier frictional driving force for positive driving of the driven member in unison with the constantly rotating shaft. Thus, in Fig. 2 the springs 248 may be very light with just enough tension to hold the members 247, 244 and 246 in proper mechanical alignment, for example, to insure that the ball bearing is kept intact. For the purpose of supplying a light driving force during the stop condition the adjustable resistance 265 is adjusted from its short-circuited condition, described above, to a fixed resistance value such that the clutch magnet will not be short-circuited when the contact springs 260 and 270 are closed but will be bridged by a low resistance circuit through these contacts which will permit a desired current to flow through the energizing winding 250 of the clutch. When this by-path is opened by the contacts 270 upon arrival of a start impulse and subsequently opened also by the off-normal contacts 260 during rotation of sleeve 20, the current through the energizing winding 250 will be increased to its full value for positive driving of the sleeve 20 by the clutch as already described above. When the sleeve 20 with its tooth 102 approaches stop position after the arrival of the stop impulse the contacts 270 will be closed in response to the marking stop pulse and contacts 260 will be closed by the tooth 102 thereby again completing the by-path through resistance 265 for the clutch winding 250 and reducing the current in this winding and therefore the driving force of the clutch to that determined by the adjustment of resistance 265.

The magnetic clutch may thus be adapted for automatic adjustment of its driving force to different values under different operating conditions in accordance with the requirements for such different operating conditions.

What is claimed is:

1. A method of operating a start-stop driving clutch comprising the steps of continuously applying a light driving friction between the continuously rotating driving member and the intermittently rotating driven member of the clutch, releasing the driven member for starting rotation thereof, magnetizing said driving and driven members to increase the driving friction by magnetic attraction between said members for positive rotation of said driven member in unison with said driving member immediately upon said releasing, at a predetermined time during said rotation discontinuing the said magnetizing to continue the rotation of the driven member with light driving friction, and then suddenly stopping said driven member by light impact against a positive stopping member.

2. A friction clutch between a continuously rotating driving shaft and an intermittently rotated driven member, said clutch comprising a driving member attached to said shaft, juxtaposed surfaces on said driving and driven members in frictional engagement under spring pressure to exert a continuous light driving force upon said driven member in its stop condition, a magnetizing winding for producing a magnetic force between said driving and driven members to increase the driving force for rotation of said driven member, circuit means for intermittent energization of said winding and releasing means for controlling the starting and the stopping of rotation of said driven means between successive energizations of said winding and including contact means for controlling the energization of said winding.

3. A friction clutch between a continuously rotating driving shaft and an intermittently rotated driven member, said clutch comprising a driving member attached to said shaft, juxtaposed surfaces on said driving and driven members in frictional engagement under spring pressure to exert a continuous light driving force upon said driven member in its stop condition, a magnetizing winding for producing a magnetic force between said driving and driven members to increase the driving force for rotation of said driven member, a start-stop latch adapted to engage said driven member for stopping rotation of said driven member once for each revolution, an operating winding for operating said latch to alternately stop said rotation and release said driven member for rotation, circuit means for sequential energization of said operating and magnetizing windings by remote control to release said driven member before fully producing said magnetic force, and contact means for maintaining the energization of said magnetizing winding during said rotation independently of the remote control and for discontinuing the energization before stopping of said driven member.

4. A start-stop friction drive comprising a power driven driving member continuously rotating at constant speed, an intermittently rotating driven member having a fixed stop position, frictional driving means between said driving and driven members, electromagnetic means adapted to be intermittently energized for establishing a driving force through said frictional driving means of sufficient strength to cause rotation of said driven member in exact unison with said driving member immediately upon starting of said driven member from said stop position and for removing said driving force during the rotation toward the next stop condition, and mechanical means for establishing a driving force through said frictional driving means of only sufficient strength to continue the rotation of said driven member after the removal of said first driving force and until its arrival in said stop position.

5. A start-stop friction drive comprising a power driven driving member continuously rotating at constant speed, an intermittently rotating driven member having a fixed stop position, frictional driving means between said driving and driven members, electromagnetic means adapted to be intermittently energized for magnetizing portions of said driving and driven members and thereby establishing a driving force through said frictional driving means of sufficient strength to cause rotation of said driven member in exact unison with said driving member immediately upon starting of said driven member from said stop position and thereby again removing said driving force during the rotation toward the next stop condition, and spring means adapted to continuously establish a driving force through said frictional driving means of only sufficient strength to continue the rotation of said driven member after the removal of said first driving force and until its arrival in said stop position.

6. A start-stop friction drive comprising a power driven member having a clutch surface and rotating continuously at constant speed, an intermittently rotating driven member having a clutch surface and having a fixed stop position, a body of frictional material placed in frictional engagement with said clutch surfaces, electromagnetic means adapted to be intermittently energized to thereby establish a magnetic field between said clutch surfaces for effecting a driving force between said surfaces of sufficient strength to cause rotation of said driven member in exact unison with said driving member immediately upon starting of said driven member from said stop position and to thereby again remove said magnetic field and said driving force during rotation toward the next stop condition, and spring means adapted to compress said body between said surfaces for effecting a driving force between said surfaces of only sufficient strength to continue the rotation of said driven member after the removal of said magnetic field and until the arrival of said driven member in said stop position.

7. A start-stop friction drive comprising a power driven member having a plurality of driving clutch surfaces and rotating continuously at constant speed, an intermittently rotating driven member having a first driven clutch surface in frictional engagement with a first of said driving surfaces and having a second driven clutch surface in frictional engagement with a second of said driving surfaces and having a fixed stop position, electromagnetic means adapted to be intermittently energized to thereby establish a magnetic field between said first driving and driven surfaces for effecting a driving force between said first surfaces of sufficient strength to cause rotation of said driven member in exact unison with said driving member immediately upon starting of said driven member from said stop position and to thereby again remove said magnetic field and said driving force during rotation toward the next stop condition, and spring means adapted to establish a driving engagement between said second driving and driven surfaces for continuously effecting a driving force between said second surfaces of only sufficient strength to insure the continued rotation of said driven member after the removal of said magnetic field and until the arrival of said driven member in said stop position.

8. A start-stop friction clutch having a constantly rotating driving member, an intermittently driven member in continuous frictional engagement with said driving member and connected to a predetermined load and having a fixed stop position, spring means for establishing said frictional engagement and dimensioned to effect a driving force of only sufficient strength to continuously prevent slippage between said driving and driven members under normal rotating conditions of said driven member, and electromagnetic means for intermittently increasing the driving force of said clutch to a sufficient strength to prevent slippage between said driving and driven members immediately upon starting of said intermittently driven member from rest condition.

9. In a start-stop friction drive a spring-pressed friction clutch including a constantly rotating driving member and an intermittently driven member having means for releasing and stopping said driven member in a predetermined position, electromagnetic means for increasing the driving force of said clutch, and control means for energizing said electromagnetic means for rotation of said driven member in unison with said constantly rotating driving member immediately upon its release in said position.

10. In a start-stop friction drive a constantly rotating driving member, a driven member in spring-pressed driving contact with said driving member, start-stop latch means for normally stopping and holding said driven member in a fixed stop position and for alternately releasing said driven member for rotation through one revolution, latch operating means for the said release of said driven member at a predetermined start instant, electromagnetic means normally demagnetized and adapted to become magnetized to apply additional driving force to said driven member, and common control means adapted to magnetize said electromagnetic means in the stop position of said driven member and to substantially simultaneously therewith control said latch operating means to release said driven member.

11. A start-stop clutch arrangement responsive to a starting signal for driving of a rotary timing mechanism through a cycle of operations between stop conditions to establishing a predetermined pllurality of successive equal time intervals beginning at a start instant, said clutch arrangement including a driven member connected to said mechanism, a power driven member continuously rotating at constant speed, spring-pressed frictional driving means between said driving and driven members for applying a driving force to said driven member of only sufficient strength to prevent slippage between said driving and driven members under normall rotation of said driven member, electromagnetic means adapted to be energized to apply an additional driving force through said frictional driving means to rotate said driven member in exact unison with said driving member immediately upon starting of said driven member from stop condition at said start instant, stop means including an operating winding for positive stopping and alternate releasing for rotation of said driven member once for each cycle, an energizing circuit including starting contact means responsive to said starting signal for completing the energizing circuit simultaneously for said operating winding and said electromagnetic means, circuit means included in said energizing circuit for control of the phase relation between the release action by said stop means and the application of said additional driving dorce due to energization of said operating winding and electromagnetic means respectively, and off-normal contact means for maintaining the energization of said electromagnetic means independently of said starting contact means until a predetermined instant before stopping of said driven member by said stop means.

SAMUEL I. CORY.